Patented Feb. 19, 1935

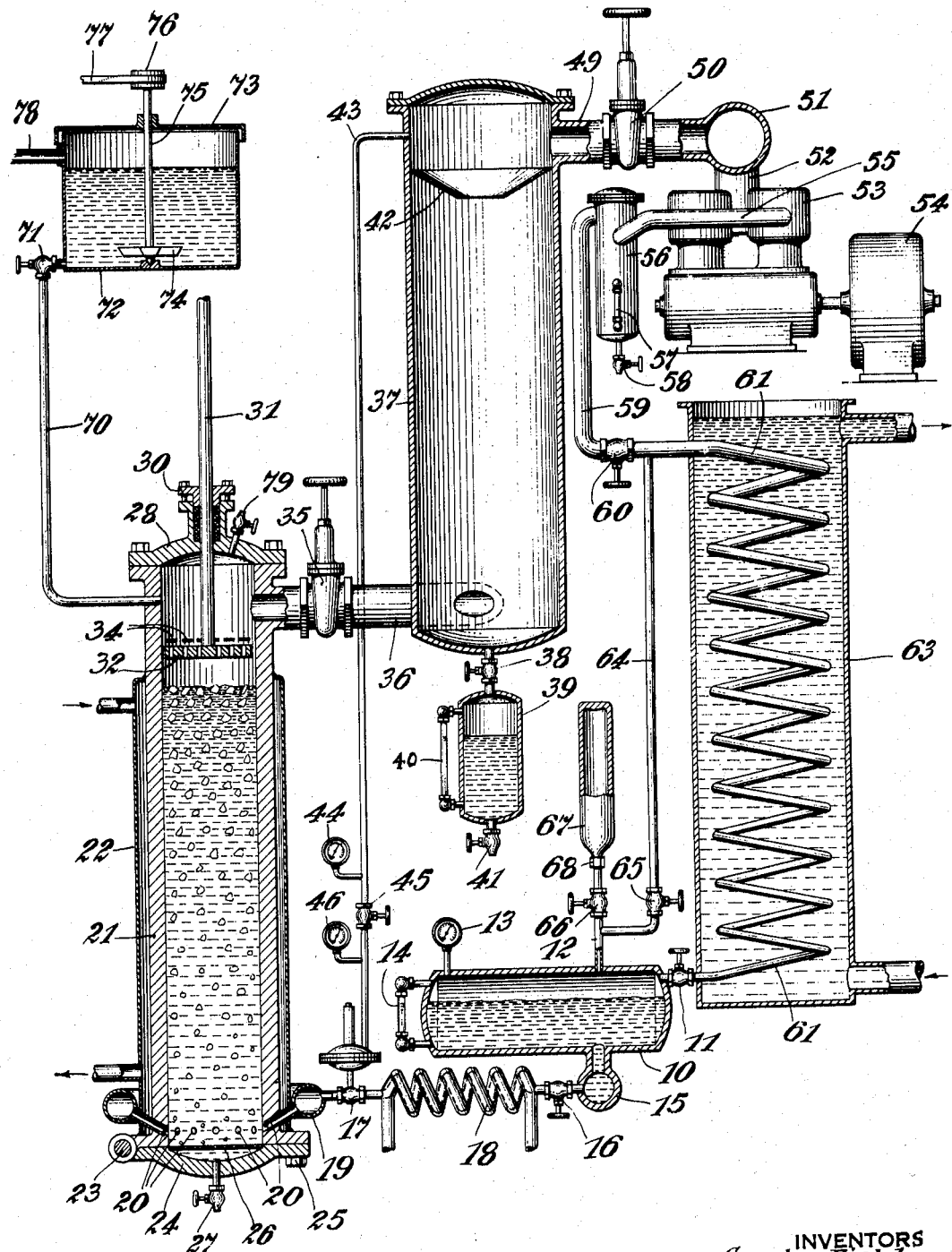

1,991,384

UNITED STATES PATENT OFFICE 1,991,384

FRIGID OR FROZEN PRODUCT AND ITS PREPARATION

Crosby Field, Brooklyn, and Frank Short, Poughkeepsie, N. Y., assignors to Flakice Corporation, Brooklyn, N. Y., a corporation of Delaware Application August 4, 1928, Serial No. 297,386

17 Claims. (Cl. 62—92)

This invention relates to a frigid or frozen product and its preparation and has for an object the provision of a novel product of this description and the economical preparation thereof. Other objects will be apparent from the following description.

The frozen product according to this invention comprises essentially a substance of a relatively low freezing point intimately associated with or frozen with another substance of relatively higher freezing point. The product in some cases is intended to be employed as a non-contacting refrigerant for packing about vessels containing perishable substances to preserve them, in which case it is desirable that the product shall be capable of absorbing large quantities of heat per unit before melting; in other cases the product is intended to be employed as a contacting refrigerant for mixing with various foods and beverages, in which case it is desirable that the product shall be harmless and have no objectionable taste or odor as well as having the capacity to absorb large quantities of heat; in still other cases the product is intended to be used directly as a food, or upon melting as a beverage, and as such should have the same desirable qualities as when used in admixture with foods or beverages.

The invention may be more clearly understood by reference to illustrative example. It is well known and common to freeze gaseous carbon dioxide to form so-called "dry ice". This carbon dioxide ice, now somewhat extensively used as a commercial non-contacting refrigerant, is for some purposes highly satisfactory but on account of its extremely low temperature is dangerous to handle and in other ways is objectionable.

We have found that a frigid or frozen product may be prepared from substances of very low freezing point such, for example, as carbon dioxide associated with substances of relatively higher freezing point such as water, brine, flavored drinks, ice creams, sherbets and the like and that such a product, which may aptly be characterized as "mixed ice" or "combined ice", has good lasting qualities and is not at all dangerous to handle since the substance of higher freezing point appears to form a protective coating over nuclei of carbon dioxide. Further, the protective coating of the frozen substance of the higher freezing point apparently forms an insulation around the nucleus of frozen carbon dioxide, whereby the coating tends to retard the flow of heat to the nucleus, and the resulting slow sublimation of the nucleus tends to keep the coating in a frozen state. Thus the efficiency of the frozen carbon dioxide as a refrigerant is distinctly increased, and its effective temperature raised. Formerly, as hereinbefore pointed out, the frozen carbon dioxide was placed around the material to be refrigerated, but with the present invention, the frozen carbon dioxide is intimately associated with and surrounded by the material to be kept frozen. When combined with brine or other solutions or mixtures, a refrigerant of varying degrees of coldness may be formed merely by varying the strength of the solution or mixture.

Since mixed or combined ice of this sort upon melting gives off only a harmless gas there can be little or no danger in its use even in foods and beverages. Conversely, its adaptability to such use is enhanced because the gas given off, if carbon dioxide, forms a desirable carbonated food or drink without further inclusion of that gas.

The product may be prepared in various ways and by various forms of apparatus. For example, it may be formed by allowing liquid carbon dioxide to escape from a tube within a vessel of the material with which it is to be associated. Apparatus of this simple nature, however, permits the loss of uncombined carbon dioxide and further, is not subject to close control.

One approved form of apparatus for preparing a mixed ice comprising carbon dioxide in association with another substance composed largely or entirely of water is diagrammatically illustrated in the single figure of the accompanying drawing.

In the lower central portion of the figure there is shown an enclosed liquid carbon dioxide receiver 10 which normally may contain liquid carbon dioxide under pressure up to some point such as that indicated by the wavy line in the receiver, the point being determinable to an observer by reference to a glass gauge 14. The liquid carbon dioxide to some extent evaporates and creates a pressure above the liquid in the receiver and this pressure may be read by reference to the pressure gauge 13.

As shown on the right of the figure, liquid carbon dioxide is supplied to the receiver 10 by a pipe controlled by a hand valve 11 from the lower end of a condenser coil 61 of a condenser 63, the hand valve 11 normally being open during operation of the apparatus. The supply of carbon dioxide will be gradually reduced in the operation of the apparatus so the receiver 10 is equipped with a replacement inlet pipe 12 provided at its upper end with a coupling 68 for attachment of a carbon dioxide supply cylinder 67 of the usual commercial type. This additional supply of carbon dioxide may be fed into the receiver as required by a hand valve 66 normally kept closed.

Between the pipe 12 at a point below the valve 66 and the upper end of the condenser coil there extends an equalizing pipe 64 furnished with a normally open hand valve 65. The equalizing pipe 64 affords egress from the receiver 10 of excess gas which otherwise would flow upwardly through the coils of the condenser in opposition to the downward flow of condensed liquid carbon dioxide.

Referring to the upper right hand corner of the figure, carbon dioxide gas under pressure is supplied to the condenser 63 by a pump 53 operated by a motor 54, the pump having an intake manifold 52 and a discharge manifold 55. Desirably a separator 56 is connected to the discharge manifold of the pump for the removal of oil or other objectionable substances from the carbon dioxide. Purified carbon dioxide leaves the top of the separator through a pipe 59 leading downwardly to the upper end of the condenser coil 61, the pipe being provided with a normally open hand valve 60. Collected refuse liquid may be drained from the separator 56 through a normally closed drain cock 58, a sight glass 57 being provided on the separator to indicate when the collected liquid should be withdrawn.

On the one side of the system which may be termed the low pressure side, still referring to the upper right hand corner of the figure, the pump 53 is supplied with gaseous carbon dioxide by a suction header 51, while on the other side, which may be termed the high pressure side, referring to the bottom portion of the figure, liquid carbon dioxide is delivered from the bottom of the receiver 10 into a supply header 15. By this arrangement the pump, condenser and receiver are enabled to serve several groups of apparatus such as will now be described. The reason for this arrangement is that each group may thus be utilized for making a different kind of ice, say sherbets of several different flavors, without requiring complete withdrawal of material in order to handle another kind of material as would be necessary if only one group were provided.

Coming now to the description of one such group of apparatus, and referring to the bottom of the figure, liquid carbon dioxide passes from the supply header 15 into the inner concentric tube of a tempering coil 18, the outer tube of which may be supplied with tempering liquid of the desired temperature. Any suitable means may be employed for producing a circulation of the tempering liquid through the coil 18. Controlling the flow from the header to the tempering coil is a supply header valve 16 normally open during the operation of the group.

From the tempering coil 18 the liquid carbon dioxide flows past an automatic control valve 17, to be further described, into an injection ring 19 from which it is injected through a plurality of nozzles 20 into a combiner 21 in which the mixed or combined ice is formed.

The combiner 21 is formed with a cylindrical portion closed at the top by a bolt-secured guide head 28 and closed at the bottom by a head 24 swingably supported upon a hinge 23 and held in closed position against the end of the cylinder by bolts 25 or other appropriate fastening devices. The head 24 is dished interiorly and the dished cavity thus formed is covered by a screen plate 26 capable of separating liquid from moderately fine solid material, such as combined ice produced. Liquid may be drained from beneath the screen plate 26 by a hand valve 27. The cylindrical portion of the combiner is surrounded by a jacket 22 for circulation of a temperature regulating liquid.

The combiner is shown to be partially filled with liquid to be combined with carbon dioxide to form the mixed or combined ice. This liquid is run into the combiner at required intervals—preferably while the group is inoperative for forming ice. As seen in the upper left hand corner of the figure the liquid is supplied from a batch mixing tank 72 through a pipe 70 provided with a normally closed hand valve 71. The tank 72 is shown to be equipped with a cover 73 and an agitator 74 fast on a shaft 75 turned by a pulley 76 driven by a power belt 77.

Within the cylindrical portion of the combiner 21 is slidably disposed an ice discharging plunger 32 perforated for passage of non-solid material and carrying above the perforations baffle plates 34. The piston is operated by a piston rod 31 passing through a guide opening in the head 28 and sealed therein by packing held by a packing gland 30. Disposed in the head 28 is a vent cock 79 permitting escape of entrapped air from the combiner.

Returning to the lower portion of the combiner, liquid carbon dioxide escapes from the injection ring 19 through the nozzles 20 into the interior of the combiner, passing in jets into the liquid contained therein where it expands to form the combined ice. As before mentioned a part of the escaping carbon dioxide solidifies in small particles and these particles being extremely cold apparently cause a surrounding layer or layers of liquid to freeze thereon.

The terms "solidify" and "freeze" as here used do not necessarily imply that the combined ice formed will in all cases be a hard solid material. In some cases a hard solid may be formed but in other cases the mixed or combined ice may be formed as a relatively soft solid somewhat on the order of mush ice. In the latter form it is more easily handled and better adapted for certain uses than it would be if formed in larger and harder particles.

Carbon dioxide which does not solidify in the combiner in the formation of ice passes upwardly through the liquid and loose particles or masses of the mixed or combined ice therein and escapes upwardly through the perforations of the piston 32, leaving the combiner at the top by way of a conduit 36 controlled by a hand valve 35 which is normally open during operations.

From the conduit 36 the gas leaving the combiner 21 enters the bottom of a liquid remover 37. This liquid remover is desirable because of the fact that the carbon dioxide gas leaving the combiner entrains with it a certain amount of liquid which should be removed. To this end the conduit 36 enters the cylindrical body of the remover 37 tangentially in order to give the outflowing gas with entrained liquid a whirling movement whereby the heavy liquid particles are centrifugally separated from the gas and collect in the bottom of the remover. Near the upper end of the remover a baffle 42 is provided for further reducing the liquid content of the gas.

The liquid separated from the gas flows from the bottom of the remover into a remover sump 39, passing thereinto through a conduit provided with a hand valve 38. The sump 39 may, if desired, be provided with a sight gauge 40. In the bottom of the sump there is provided a drain cock 41 for drawing off the collected liquid which may be returned in any suitable way to the batch mixing tank 72 for re-use, it being noted that the pressure of gas above the collected liquid in the sump is sufficient to assist in this return of liquid even though the batch mixing tank may be located above the sump.

It may here be mentioned that liquid drained from the bottom of the combiner 21 at the end of a run through the pipe controlled by valve 27 may likewise be returned to the tank 72 for re-use and here again the pressure of gas above the liquid is capable of effecting the return flow. Liquid supplied to the tank 72 from both of these sources may enter by a pipe 78.

The separated gas passes from the remover 37 by way of a conduit 49 equipped with a normally open suction header valve 50 into the suction header 51 already described.

From the upper end of the remover 37 extends a control pressure pipe 43 which connects with the control side of the automatic valve 17 previously mentioned. A hand valve 45 is provided in the conduit 43 for regulating the passage of gas. The pressure of the gas above the valve 45, that is, the pressure of the gas present at the top of the remover 37, may be read by a pressure gauge 44 while the pressure of the gas present below the valve 45 effective upon the automatic valve 17 may be read upon the pressure gauge 46. From this description it will be evident that the automatic valve 17 will be closed somewhat by any rise in pressure on the low side of the system, i. e., by any rise in pressure of the carbon dioxide gas present in the remover 37, and thus the flow of liquid carbon dioxide into the combiner 21 will be commensurately reduced. Conversely, if the pressure of gas in the remover 37 decreases below a given value, the automatic valve 17 will open somewhat, thereby increasing the flow of liquid carbon dioxide into the combiner.

The operation of the apparatus, assuming that at the beginning of operations the compressor-condenser-receiver apparatus is already in operation for other groups of combiner apparatus; that a sufficient volume of liquid carbon dioxide is in the receiver 10; that the condenser coil valves 11, 60 and the equalizer valve 65 are open and the auxiliary liquid carbon dioxide supply valve 66 is closed; that the supply header valve 16, the combiner drain valve 27, the gas exhaust valve 35 and the suction header valve 50 are all closed; that the covers 24 and 28 of the combiner are tightly secured thereon; and that the piston 32 is in the retracted position as shown, is as follows:

The operator opens the air vent cock 79 and the liquid supply valve 71 in supply pipe 70 to allow liquid to flow into the combiner, the inflowing liquid forcing air out of the vent cock 79. When the proper amount of liquid has been run into the combiner the operator closes the liquid supply valve 71 and opens gas exhaust valve 35 to permit stored gas from the remover 37 to flow backward into the combiner to expel the remaining air, after which he closes the air vent cock but leaves valve 35 open. Thereafter the suction header valve 50 and then the supply header valve 16 are opened and the operation of the group of apparatus starts.

The liquid carbon dioxide will flow from the receiver 10 into the supply header 15, through the tempering coil 18, past the automatic valve 17 into the annular injection ring 19, and thence by nozzles 20 into the liquid in the combiner. The escaping liquid carbon dioxide, as previously described, will in part solidify to form carbon dioxide ice or snow and in part escape as gas from the top of the combiner through the pipe 36 into the remover. The carbon dioxide ice being extremely cold causes some of the surrounding liquid to freeze or congeal with it to form bodies of mixed or combined ice which may float to the surface of the liquid in the combiner, nevertheless permitting free upward flow and escape of uncombined carbon dioxide gas.

During the run it may be desirable to control the proportion of carbon dioxide ice contained in the mixed or combined ice. The carbon dioxide content may be increased by pre-cooling the liquid carbon dioxide in the tempering coil 18 and may be decreased by slightly preheating the liquid carbon dioxide in the tempering coil 18. It will also be apparent that the proportion of carbon dioxide ice in the mixed or combined ice may be reduced by the circulation of a refrigerant in the combiner jacket 22, this additional refrigeration serving to lower the temperature of the liquid in the combiner by external means instead of entirely by action of the carbon dioxide introduced into the liquid.

When a desired amount of ice is formed in the combiner the supply header valve 16, the suction header valve 50 and the gas exhaust valve 35 are closed to stop the operation in the particular group of apparatus under consideration and uncombined liquid is drained from the bottom of the combiner through the drain valve 27, leaving only ice in the combiner. The bottom cover 24 is unfastened and the cover swung open about the hinge 23 after which the piston 32 is moved downwardly through the combiner to push the ice out of the bottom into any suitable receiver. If there is any tendency for the ice to stick to the walls of the combiner a warm liquid may be circulated through the jacket 22 to melt the ice slightly, permitting it to be easily ejected by the piston.

After one batch of ice has been formed in this manner and removed the piston will be retracted and the bottom cover again fastened beneath the combiner and a new batch of liquid run into the combiner to start operations again.

The product made in the manner described above is susceptible of many and varied uses either as a contacting or a non-contacting refrigerant or as a directly produced edible product. The carbon dioxide content of the particular product described sublimes, i. e. passes directly from the solid to the gaseous form, when the product "melts" and directly carbonates any substance or liquid in which the product is used. A few specific examples of the product have been described for purposes of illustration but many others may be made in the same general manner. Likewise, only one form of apparatus has been particularly disclosed but the product may be made by various other forms of apparatus. It is therefore to be understood that the invention is not to be limited except by the scope of the subjoined claims considered in relation to the prior art.

What is claimed is:

1. A frozen product comprising nuclei of a frozen substance of a relatively low freezing point surrounded by a frozen substance of a relatively higher freezing point.

2. Apparatus for preparing a combined frozen product comprising gas liquefying mechanism and a group of combiner mechanisms connected on opposite sides of said liquefying mechanism for receiving liquefied gas and returning the gas, said combiner mechanisms comprising a freezing vessel containing a body of liquid, means for injecting liquefied gas into the liquid in the vessel whereby a portion of the gas freezes with a portion of the liquid and a portion of the gas escapes above the liquid, a remover for separating entrained liquid from the escaping gas, means for draining liquid from the frozen product in the freezing vessel when a batch is formed, and means for removing the frozen product from the freezing vessel.

3. Apparatus for preparing a combined frozen product comprising a combiner for holding a body of liquid, a conduit for conducting liquefied gas into the combiner, and means to alter the temperature of liquid in the combiner including a fluid-circulation jacket surrounding the combiner.

4. The method of preparing a frozen product which comprises liberating liquid carbon dioxide within a body of liquid of relatively higher freezing point while subjecting the second liquid to a refrigerant to reduce the temperature thereof.

5. The method of preparing a combined frozen product which comprises liberating liquid carbon dioxide into a body of liquid of a higher freezing point confined in a container, whereby a portion of the carbon dioxide freezes with the liquid and remains frozen therewith and a portion of the carbon dioxide escapes above the liquid, collecting the escaped carbon dioxide with entrained liquid, removing the entrained liquid from the collected carbon dioxide, reliquefying the collected carbon dioxide, and returning the reliquefied carbon dioxide to the liquid within the container.

6. A frozen product comprising a frozen substance having a relatively high freezing point, and frozen particles of carbon dioxide intimately mixed with and surrounded by said frozen substance, the sublimation of said carbon dioxide being effective to refrigerate said frozen substance, said frozen substance being adapted to retard substantially the flow of heat to said frozen carbon dioxide whereby the temperature of said product is maintained substantially above that of the freezing point of carbon dioxide.

7. A frozen product comprising a frozen substance having a relatively high freezing point, and frozen particles of carbon dioxide intimately mixed with and surrounded by said frozen substance, the sublimation of said frozen carbon dioxide acting to refrigerate said frozen substance, said frozen substance being adapted to retard substantially the flow of heat to said frozen carbon dioxide whereby the temperature of said product is maintained substantially above that of the freezing point of carbon dioxide and below the freezing point of said substance as long as frozen carbon dioxide is present.

8. A frozen product comprising a frozen substance having a relatively high freezing point, frozen particles of carbon dioxide intimately mixed with and surrounded by said frozen substance and refrigerating the same by sublimation, said frozen substance being adapted to retard substantially the flow of heat to said frozen carbon dioxide whereby said substance is refrigerated without non-contacting refrigerants.

9. The method of preparing a frozen mixture which comprises the steps of treating with liquid carbon dioxide a body of liquid of a relatively high freezing point confined in a vessel whereby a portion of the carbon dioxide solidifies and freezes with the first named liquid and a portion of the carbon dioxide vaporizes and escapes above the mixture, and of automatically regulating the flow of carbon dioxide into the vessel in accordance with the pressure of the carbon dioxide escaping above the mixture to control the proportion of the carbon dioxide remaining with the mixture in the solid form to the proportion escaping from the mixture in a gaseous form.

10. The method of preparing a frozen mixture which comprises placing a body of liquid having a relatively high freezing point and relatively low vapor pressure in a container, conducting refrigerating liquefied gas having a relatively low freezing point and relatively high vapor pressure into the container, and controlling the amount and temperature of the inflowing liquefied gas to control the amount of the refrigerating solidified gas in the resulting mixture.

11. The method of preparing a frozen mixture which comprises placing a body of liquid having a relatively high freezing point and relatively low vapor pressure in a container, conducting refrigerating liquefied gas having a relatively low freezing point and relatively high vapor pressure into the container, controlling the temperature of the container and controlling the amount of the inflowing liquefied gas to control the amount of the refrigerating solidified gas in the resulting mixture.

12. The method of preparing a frozen product which comprises injecting a liquefied fluid having a relatively low freezing point into a liquefied fluid having a relatively high freezing point, allowing a portion of the liquid having a relatively low freezing point to change into its gaseous phase whereby the liquefied fluid having the relatively high freezing point is frozen and whereby a portion of the liquefied fluid having the relatively low freezing point is also frozen, and automatically controlling the flow of liquefied fluid having the relatively low freezing point by the total vapor pressure existing above the product being frozen to control the ratio of the frozen fluid having the relatively low freezing point to the frozen liquid having the relatively high freezing point in the resulting product.

13. Apparatus for manufacturing a frozen product consisting of a plurality of frozen constituents comprising gas liquefying mechanism, a combining apparatus for receiving a liquid to be frozen and for receiving liquefied gas from the gas liquefying apparatus and returning a portion of it thereto, said combining mechanism including a freezing vessel, means for injecting liquefied gas into the liquid in the vessel, whereby a portion of the liquefied gas freezes with a portion of the liquid and a portion of the gas escapes above the liquid; automatic means for controlling the flow of the liquefied gas, control means for controlling the temperature of said vessel, and said automatic means and said control means thus being adapted to control the proportion of the liquefied gas remaining frozen with the frozen product.

14. In apparatus for freezing liquids by means of liberating a liquefied gas having a relatively low freezing point and a relatively high vapor pressure into the liquid to be frozen, in combination, a cylindrically shaped vessel for containing the liquid to be frozen, means for injecting liquefied gas at the bottom of said container, and a discharging plunger perforated for the passage of non-solid material, said plunger being mounted for reciprocable movement in said vessel.

15. In apparatus for freezing liquids by means of liberating a liquefied gas having a relatively low freezing point and a relatively high vapor pressure into the liquid to be frozen, in combination, a cylindrically shaped vessel for containing the liquid to be frozen, means for injecting liquefied gas at the bottom of said container, a discharging plunger perforated for the passage of non-solid material, said plunger being mounted for reciprocable movement in said vessel, and temperature controlling means associated with said vessel for controlling the temperature of the walls thereof.

16. In apparatus of the class described, in combination, a vertical cylindrically shaped vessel for containing a liquid to be frozen, a hinged cup shaped bottom head for closing the bottom of said vessel, and means including a screen plate associated with said head for separating liquid frozen in said vessel from the cup shaped surface of said head.

17. The method of preparing a frozen mixture which comprises subjecting a liquid of relatively high freezing point and relatively low vapor pressure to the refrigerating action of a refrigerating liquefied gas having a relatively low freezing point and a relatively high vapor pressure injected into said first liquid to refrigerate and solidify the first liquid and to solidify together with the solidified first liquid a portion of the refrigerating gas, and controlling the surrounding temperature of the first liquid and the amount of inflowing liquefied gas to control the amount of the refrigerating solidified gas in the resulting mixture.

CROSBY FIELD.
FRANK SHORT.